United States Patent
Iwashina

(10) Patent No.: US 11,204,497 B2
(45) Date of Patent: Dec. 21, 2021

(54) SCANNING-TYPE DISPLAY DEVICE, SCANNING-TYPE DISPLAY SYSTEM, AND METHOD FOR MANUFACTURING LIGHT-DIFFUSING PART

(71) Applicant: HAMAMATSU PHOTONICS K.K., Hamamatsu (JP)

(72) Inventor: Shinya Iwashina, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 34 days.

(21) Appl. No.: 16/621,396

(22) PCT Filed: Jun. 11, 2018

(86) PCT No.: PCT/JP2018/022256
§ 371 (c)(1),
(2) Date: Dec. 11, 2019

(87) PCT Pub. No.: WO2018/230509
PCT Pub. Date: Dec. 20, 2018

(65) Prior Publication Data
US 2020/0166748 A1    May 28, 2020

(30) Foreign Application Priority Data
Jun. 13, 2017    (JP) .............................. JP2017-116328

(51) Int. Cl.
*G02B 27/01* (2006.01)
*G02B 3/00* (2006.01)

(52) U.S. Cl.
CPC ....... *G02B 27/0101* (2013.01); *G02B 3/0012* (2013.01); *G02B 3/0056* (2013.01); *G02B 2027/0147* (2013.01)

(58) Field of Classification Search
CPC .............. G02B 27/0101; G02B 3/0012; G02B 3/0056; G02B 2027/011;
(Continued)

(56) References Cited

U.S. PATENT DOCUMENTS

2009/0135374 A1    5/2009    Horiuchi et al.
2013/0050655 A1    2/2013    Fujikawa et al.

FOREIGN PATENT DOCUMENTS

CN    101203802 A    6/2008
CN    102967938 A    3/2013
(Continued)

OTHER PUBLICATIONS

International Preliminary Report on Patentability dated Dec. 26, 2019 for PCT/JP2018/022256.

*Primary Examiner* — Ryan D Howard
(74) *Attorney, Agent, or Firm* — Faegre Drinker Biddle & Reath LLP

(57) ABSTRACT

A scanning-type display device includes: a light source which emits projection-display laser light; an optical scanning unit which uses the laser light emitted from the light source in scanning; and a light diffusion unit which includes a plurality of light diffusion channels arranged in two dimensions and diffuses the laser light used in scanning by the optical scanning unit. The light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye.

20 Claims, 4 Drawing Sheets

(58) Field of Classification Search
CPC ........ G02B 2027/0121; G02B 27/0172; G02B 5/02; G02B 5/0205; G02B 5/0215; G02B 5/0221; G02B 5/0268; H04N 9/3129
See application file for complete search history.

(56) References Cited

FOREIGN PATENT DOCUMENTS

| | | |
|---|---|---|
| JP | 2016-133700 A | 7/2016 |
| JP | 2016-535323 A | 11/2016 |
| JP | 2017-78830 A | 4/2017 |
| TW | 201641990 A | 12/2016 |
| WO | WO 2014/119407 A1 | 8/2014 |
| WO | WO-2016/034247 A1 | 3/2016 |
| WO | WO-2016/035607 A1 | 3/2016 |

(a)

(b)

SCANNING-TYPE DISPLAY DEVICE, SCANNING-TYPE DISPLAY SYSTEM, AND METHOD FOR MANUFACTURING LIGHT-DIFFUSING PART

TECHNICAL FIELD

The present disclosure relates to a scanning-type display device, a scanning-type display system, and a method for manufacturing a light diffusion unit.

BACKGROUND ART

There is known a scanning-type display device including a light source which emits projection-display laser light, an optical scanning unit which uses the laser light emitted from the light source in scanning, and a light diffusion unit which diffuses the laser light used in scanning by the optical scanning unit (for example, see Patent Literature 1). As the light diffusion unit, for example, an optical element including a plurality of light diffusion channels arranged in two dimensions such as a transmissive microlens array is used.

CITATION LIST

Patent Literature

Patent Literature 1: Japanese Unexamined Patent Publication No. 2016-133700

SUMMARY OF INVENTION

Technical Problem

In the above-described scanning-type display device, since the laser light is coherent light, luminance unevenness (including irregular luminance unevenness (speckle) and regular luminance unevenness) occurs in a displayed image regardless of the size (the beam diameter) of the laser light in the light diffusion unit.

An object of the present disclosure is to provide a scanning-type display device and a scanning-type display system capable of suppressing an occurrence of luminance unevenness on a displayed image and a method for manufacturing a light diffusion unit used for them.

Solution to Problem

A scanning-type display device according to an aspect of the present disclosure includes: a light source which emits projection-display laser light; an optical scanning unit which uses the laser light emitted from the light source in scanning; and a light diffusion unit which includes a plurality of light diffusion channels arranged in two dimensions and diffuses the laser light used in scanning by the optical scanning unit, in which the light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye.

According to the scanning-type display device, the angle formed by the optical paths extending to the eye of the observer through a pair of light diffusion channels arbitrarily selected can be set to be equal to or larger than, for example, the resolution angle of the eye. Thus, according to the scanning-type display device, it is possible to suppress an occurrence of luminance unevenness on a displayed image in an eye having an assumed visual acuity at an assumed position regardless of the size (the beam diameter) of the laser light in the light diffusion unit.

In the scanning-type display device of an aspect of the present disclosure, the light diffusion unit may be configured so that the angle formed by the optical paths becomes equal to or larger than 1 minute. Accordingly, since the resolution angle of the eye having the visual acuity of 1.0 is 1 minute, the angle formed by the optical paths extending to the eye of the observer through a pair of light diffusion channels arbitrarily selected can be set to be equal to or larger than the resolution angle of the eye having the visual acuity of 1.0. Thus, it is possible to suppress an occurrence of luminance unevenness on a displayed image in the eye having the visual acuity of 1.0 or more.

In the scanning-type display device of an aspect of the present disclosure, the light diffusion unit may be configured so that the angle formed by the optical paths becomes equal to or larger than 1.42 minute. Accordingly, since the resolution angle of the eye having the visual acuity of 0.7 is 1.42 minute, the angle formed by the optical paths extending to the eye of the observer through a pair of light diffusion channels arbitrarily selected can be set to be equal to or larger than the resolution angle of the eye having the visual acuity of 0.7. Thus, it is possible to suppress an occurrence of luminance unevenness on a displayed image in the eye having the visual acuity of 0.7 or more.

In the scanning-type display device of an aspect of the present disclosure, when the resolution angle is denoted by $\alpha$, an arrangement pitch of the plurality of light diffusion channels is denoted by P, a magnification of an optical system disposed between the light diffusion unit and the eye is denoted by M, and a distance from the light diffusion unit to the eye is denoted by L, the light diffusion unit may be configured so as to satisfy $\alpha \leq \tan^{-1}(P/L) \times M$. Accordingly, even when the optical system is disposed between the light diffusion unit and the eye, it is possible to reliably suppress an occurrence of luminance unevenness on a displayed image in the eye having an assumed visual acuity at an assumed position.

In the scanning-type display device of an aspect of the present disclosure, when the resolution angle is denoted by $\alpha$, the arrangement pitch of the plurality of light diffusion channels is denoted by P, and the distance from the light diffusion unit to the eye is denoted by L in a case in which the optical path directly extends from the light diffusion unit to the eye, the light diffusion unit may be configured so as to satisfy $\alpha \leq \tan^{-1}(P/L)$. Accordingly, when the optical system is not disposed between the light diffusion unit and the eye, it is possible to reliably suppress an occurrence of luminance unevenness on a displayed image in the eye having an assumed visual acuity at an assumed position.

In the scanning-type display device of an aspect of the present disclosure, the arrangement pitch of the plurality of light diffusion channels may be random. Accordingly, it is possible to more reliably suppress an occurrence of luminance unevenness on a displayed image in the eye having an assumed visual acuity at an assumed position.

In the scanning-type display device of an aspect of the present disclosure, the light diffusion unit may be a transmissive microlens array. Accordingly, it is possible to reliably and easily realize the diffusion of the laser light by the plurality of light diffusion channels arranged in two dimensions.

A scanning-type display system according to an aspect of the present disclosure includes: a light source which emits projection-display laser light; an optical scanning unit which uses the laser light emitted from the light source in scanning; and a light diffusion unit which includes a plurality of light diffusion channels arranged in two dimensions and diffuses the laser light used in scanning by the optical scanning unit, in which the light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye.

According to the scanning-type display system, it is possible to suppress an occurrence of luminance unevenness on a displayed image in the eye having an assumed visual acuity at an assumed position regardless of the size of the laser light in the light diffusion unit.

In the scanning-type display system according to an aspect of the present disclosure, the light diffusion unit may be configured so that the angle formed by the optical paths becomes equal to or larger than 1 minute. Accordingly, since the resolution angle of the eye having the visual acuity of 1.0 is 1 minute, the angle formed by the optical paths extending to the eye of the observer through a pair of light diffusion channels arbitrarily selected can be set to be equal to or larger than the resolution angle of the eye having the visual acuity of 1.0. Thus, it is possible to suppress an occurrence of luminance unevenness on a displayed image in the eye having the visual acuity of 1.0 or more.

In the scanning-type display system according to an aspect of the present disclosure, the light diffusion unit may be configured so that the angle formed by the optical paths becomes equal to or larger than 1.42 minute. Accordingly, since the resolution angle of the eye having the visual acuity of 0.7 is 1.42 minute, the angle formed by the optical paths extending to the eye of the observer through a pair of light diffusion channels arbitrarily selected can be set to be equal to or larger than the resolution angle of the eye having the visual acuity of 0.7. Thus, it is possible to suppress an occurrence of luminance unevenness on a displayed image in the eye having the visual acuity of 0.7 or more.

The scanning-type display system according to an aspect of the present disclosure further includes an optical system which is disposed at a subsequent stage of the light diffusion unit, in which when the resolution angle is denoted by $\alpha$, an arrangement pitch of the plurality of light diffusion channels is denoted by P, a magnification of the optical system is denoted by M, and a distance from the light diffusion unit to the eye is denoted by L, the light diffusion unit may be configured so as to satisfy $\alpha \leq \tan^{-1}(P/L) \times M$. Accordingly, even when the optical system is disposed between the light diffusion unit and the eye, it is possible to reliably suppress an occurrence of luminance unevenness on a displayed image in the eye having an assumed visual acuity at an assumed position.

In the scanning-type display system according to an aspect of the present disclosure, when the resolution angle is denoted by $\alpha$, the arrangement pitch of the plurality of light diffusion channels is denoted by P, and the distance from the light diffusion unit to the eye is denoted by L in a case in which the optical path directly extends from the light diffusion unit to the eye, the light diffusion unit may be configured so as to satisfy $\alpha \leq \tan^{-1}(P/L)$. Accordingly, when the optical system is not disposed between the light diffusion unit and the eye, it is possible to reliably suppress an occurrence of luminance unevenness on a displayed image in the eye having an assumed visual acuity at an assumed position.

In the scanning-type display system according to an aspect of the present disclosure, the arrangement pitch of the plurality of light diffusion channels may be random. Accordingly, it is possible to more reliably suppress an occurrence of luminance unevenness on a displayed image in the eye having an assumed visual acuity at an assumed position.

A method for manufacturing a light diffusion unit according to an aspect of the present disclosure is a method for manufacturing a light diffusion unit used for a scanning-type display device including a light source which emits projection-display laser light, an optical scanning unit which uses the laser light emitted from the light source in scanning, and a light diffusion unit which includes a plurality of light diffusion channels arranged in two dimensions and diffuses the laser light used in scanning by the optical scanning unit, in which the light diffusion unit is manufactured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye.

According to the method for manufacturing the light diffusion unit, it is possible to obtain the light diffusion unit capable of suppressing an occurrence of luminance unevenness on a displayed image in the eye having an assumed visual acuity at an assumed position regardless of the size of the laser light in the light diffusion unit.

In the method for manufacturing the light diffusion unit according to an aspect of the present disclosure, when the resolution angle is denoted by $\alpha$, an arrangement pitch of the plurality of light diffusion channels is denoted by P, a magnification of an optical system disposed between the light diffusion unit and the eye is denoted by M, and a distance from the light diffusion unit to the eye is denoted by L, the light diffusion unit may be manufactured so as to satisfy $\alpha \leq \tan^{-1}(P/L) \times M$. Accordingly, even when the optical system is disposed between the light diffusion unit and the eye, it is possible to obtain the light diffusion unit capable of reliably suppressing an occurrence of luminance unevenness on a displayed image in the eye having an assumed visual acuity at an assumed position.

In the method for manufacturing the light diffusion unit according to an aspect of the present disclosure, when the resolution angle is denoted by $\alpha$, the arrangement pitch of the plurality of light diffusion channels is denoted by P, and the distance from the light diffusion unit to the eye is denoted by L in a case in which the optical path directly extends from the light diffusion unit to the eye, the light diffusion unit may be manufactured so as to satisfy $\alpha \leq \tan^{-1}(P/L)$. Accordingly, when the optical system is not disposed between the light diffusion unit and the eye, it is possible to obtain the light diffusion unit capable of reliably suppressing an occurrence of luminance unevenness on a displayed image in the eye having an assumed visual acuity at an assumed position.

Advantageous Effects of Invention

According to the present disclosure, it is possible to provide a scanning-type display device and a scanning-type display system capable of suppressing an occurrence of luminance unevenness on a displayed image and a method for manufacturing a light diffusion unit used for them.

DESCRIPTION OF EMBODIMENTS

Figure 1:
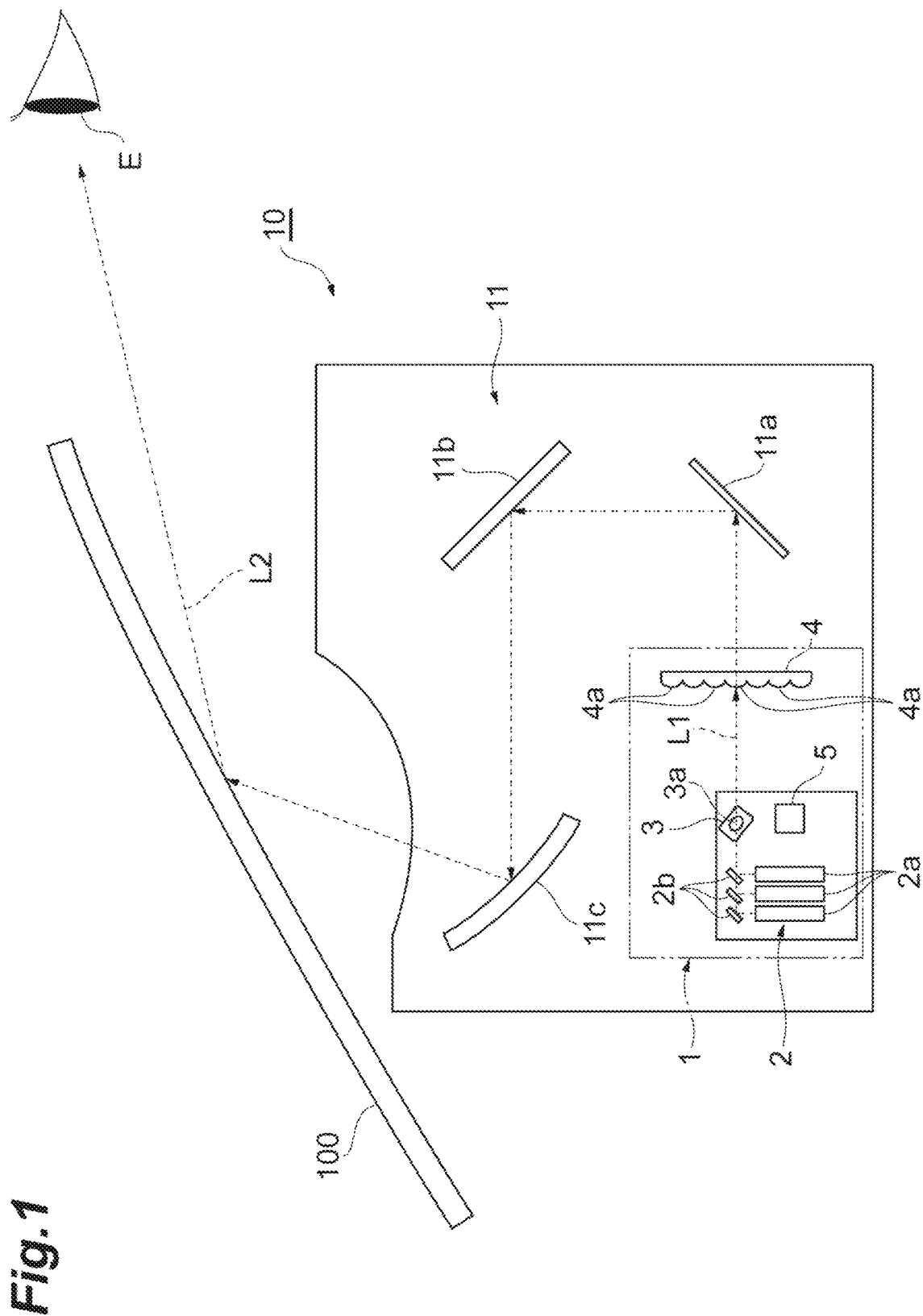
FIG. 1 is a configuration diagram of a scanning-type display device and a scanning-type display system of an embodiment.

Hereinafter, an embodiment of the present disclosure will be described in detail with reference to the drawings. In the drawings, the same or corresponding components will be denoted by the same reference numerals and a redundant description thereof will be omitted.

As illustrated in FIG. 1, a scanning-type display system 10 is, for example, a laser scanning-type projection display mounted on an automobile and displays (projection-displays) an image on a front glass 100 of the automobile. The scanning-type display system 10 includes a scanning-type display device 1 and an optical system 11. The optical system 11 includes a plurality of flat mirrors 11a and 11b, a concave mirror 11c, and the front glass 100. The front glass 100 functions as an optical element at the last stage of the optical system 11. Projection-display light L2 emitted from the scanning-type display device 1 is sequentially reflected by the flat mirror 11a, the flat mirror 11b, the concave mirror 11c, and the front glass 100 and is incident to an eye E of an observer.

The scanning-type display device 1 includes a light source 2, an optical scanning unit 3, a light diffusion unit 4, and a control unit 5. The light source 2 emits projection-display laser light L1. More specifically, the light source 2 includes a plurality of light emitting portions 2a. For example, the plurality of light emitting portions 2a are respectively a red laser diode, a green laser diode, and a blue laser diode. Each light emitting portion 2a emits the laser light L1 having a visible wavelength. The laser light L1 emitted from each light emitting portion 2a is reflected by a plurality of mirrors 2b including a dichroic mirror, travels on the same optical path, and is incident to the optical scanning unit 3.

The optical scanning unit 3 uses the laser light L1 emitted from the light source 2 in scanning. More specifically, the optical scanning unit 3 is an MEMS mirror which reflects the laser light L1 emitted from the light source 2, and uses the laser light L1 in scanning. The MEMS mirror is a drive mirror which is manufactured according to a Micro Electro Mechanical Systems (MEMS) technique and examples of the drive type include an electromagnetic drive type, an electrostatic drive type, a piezoelectric drive type, a thermal drive type, and the like. A mirror 3a of the optical scanning unit 3 is tiltable about two orthogonal axes and is tilted fast at a resonant frequency in the rotation about one axis. The optical scanning unit 3 which is the MEMS mirror scans the light diffusion unit 4 with the laser light L1.

The light diffusion unit 4 includes a plurality of light diffusion channels 4a which are arranged in two dimensions and diffuses the laser light L1 used in scanning by the optical scanning unit 3. More specifically, the light diffusion unit 4 is a transmissive microlens array. That is, the light diffusion unit 4 transmits and diffuses the laser light L1 used in scanning by the optical scanning unit 3. The light diffusion channel 4a is each of, for example, a plurality of microlenses arranged in a matrix shape. The light forming an image in the laser light L1 diffused by the light diffusion unit 4 is incident to the optical system 11 disposed at the subsequent stage of the light diffusion unit 4 as the projection-display light L2. The light incident surface of the light diffusion unit 4 includes a plurality of convex surfaces corresponding to the plurality of microlenses. Meanwhile, the light emission surface of the light diffusion unit 4 is a flat surface.

The control unit 5 includes a Central Processing Unit (CPU), a Read Only Memory (ROM), a Random Access Memory (RAM), and the like and controls the operation of the scanning-type display device 1. As an example, the control unit 5 starts the output of each light emitting portion 2a of the light source 2 when receiving a projection-display start input signal. Accordingly, the laser light L1 is emitted from the light source 2. Almost simultaneously, the control unit 5 starts the operation of the optical scanning unit 3. Accordingly, in the optical scanning unit 3, the tilting of the mirror 3a is started and the laser light L1 emitted from the light source 2 is scanned the light diffusion unit 4 with. At this time, the control unit 5 changes the ratio of the laser light L1 emitted from each light emitting portion 2a in response to the scan position of the laser light L1 in the light diffusion unit 4. Accordingly, the projection-display light L2 (that is, the light forming an image in the laser light L1 diffused by the light diffusion unit 4) is sequentially reflected by the flat mirror 11a, the flat mirror 11b, the concave mirror 11c, and the front glass 100 and is incident to the eye E of the observer.

Figure 2:
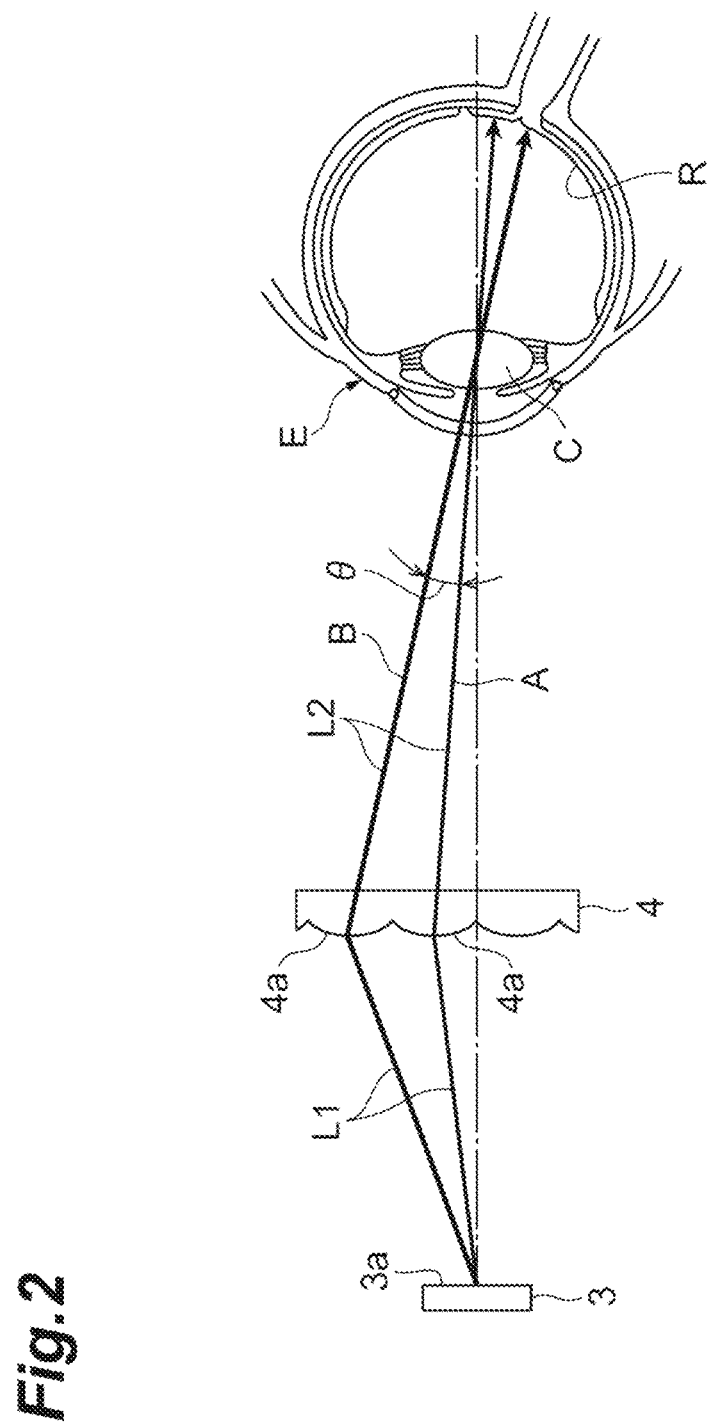
FIG. 2 is a diagram illustrating an optical path extending from an optical scanning unit to an eye through a light diffusion unit.
Figure 3:
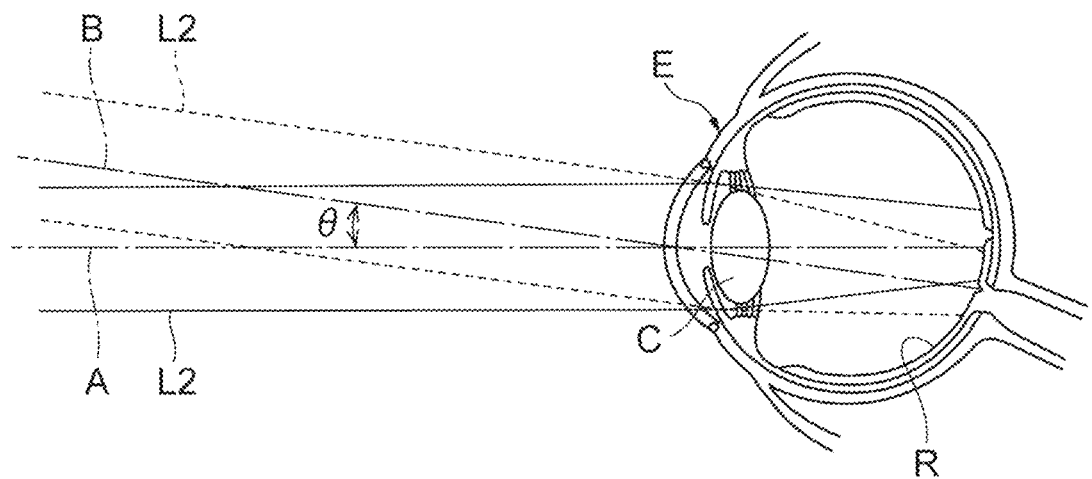
FIG. 3 is a diagram illustrating a state of light which is incident to an eye.
Figure 3:
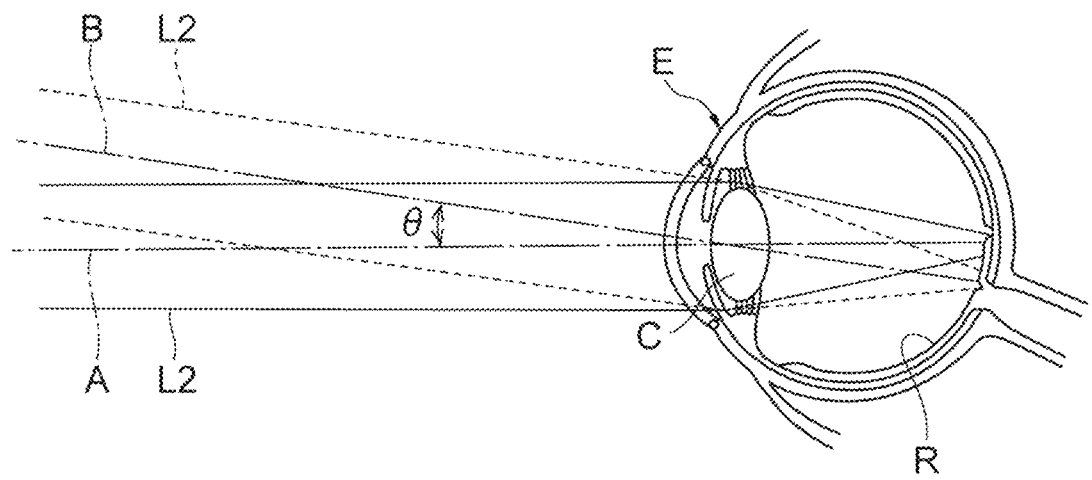

Here, a principle that luminance unevenness (including irregular luminance unevenness (speckle) and regular luminance unevenness) occurs on the displayed image will be described. FIG. 2 is a diagram showing the optical path extending from the optical scanning unit 3 to the eye E through the light diffusion unit 4. FIG. 3 is a diagram illustrating a state of the light L2 which is incident to an eye. For convenience of description, in FIG. 2, the optical scanning unit 3, the light diffusion unit 4, and the eye E are illustrated on a straight line and the optical system 11 is not illustrated.

As illustrated in FIG. 2, when the laser light L1 reflected by the optical scanning unit 3 is incident to a pair of light diffusion channels 4a and 4a adjacent to each other (specifically, the light diffusion channels are adjacent to each other in the horizontal scanning direction and the vertical scanning direction of the laser light L1) arbitrarily selected from among the plurality of light diffusion channels 4a, a part of the light L2 diffused by one light diffusion channel 4a is incident to the eye E through the optical path A and a part of the light L2 diffused by the other light diffusion channel 4a is incident to the eye E through the optical path B. Then, the light L2 incident to the eye E is condensed on a retina R by a lens C.

As illustrated in FIG. 3, the condensing size of the light L2 on the retina R depends on the visual acuity of the eye E. Since the visual acuity of the eye E illustrated in FIG. 3($a$) is lower than the visual acuity of the eye E illustrated in FIG. 3($b$), the condensing size of the light L2 on the retina R increases and the light L2 incident to the eye E through the optical path A and the light L2 incident to the eye E through the optical path B overlap each other on the retina R. Meanwhile, since the visual acuity of the eye E illustrated in FIG. 3($b$) is higher than the visual acuity of the eye E illustrated in FIG. 3($a$), the condensing size of the light L2 on the retina R decreases and the light L2 incident to the eye E through the optical path A and the light L2 incident to the eye E through the optical path B do not overlap each other on the retina R. Since a phase difference occurs between the light L2 incident to the eye E through the optical path A and the light L2 incident to the eye E through the optical path B, an interference occurs when the light L2 incident to the eye E through the optical path A and the light L2 incident to the eye E through the optical path B overlap each other on the retina R as illustrated in FIG. 3(a). Accordingly, there is a possibility that luminance unevenness occurs on the displayed image.

A minimum angle capable of separating the light L2 incident to the eye E through the optical path A and the light L2 incident to the eye E through the optical path B on the retina R is set as the resolution angle of the eye E. For example, as illustrated in FIG. 3(a), since the condensing size of the light L2 on the retina R increases when the visual acuity of the eye E is low, the resolution angle increases. Generally, the resolution angle is 1 minute when the visual acuity is 1.0, the resolution angle is 1.42 minute when the visual acuity is 0.7, and the resolution angle is 2 minute when the visual acuity is 0.5.

Thus, since the light L2 incident to the eye E through the optical path A and the light L2 incident to the eye E through the optical path B do not overlap each other on the retina R when the position and the visual acuity of the eye E of the observer are assumed and the "angle θ formed by the optical paths A and B" (the angle θ formed by the optical paths A and B extending to the eye E of the observer through a pair of light diffusion channels 4a and 4a arbitrarily selected which are adjacent to each other (specifically, the light diffusion channels are adjacent to each other in the scanning direction of the laser light L1)) determined by the position of the assumed eye E is equal to or larger than the "resolution angle of the eye E" determined by the visual acuity of the assumed eye E, no interference occurs. Thus, luminance unevenness does not occur on the displayed image in the eye E having an assumed visual acuity at an assumed position.

From the above-described knowledge, in the scanning-type display system 10 and further the scanning-type display device 1, the light diffusion unit 4 is configured so that the angle θ formed by the optical paths A and B becomes equal to or larger than the resolution angle of the eye E. Specifically, the arrangement pitch of the plurality of light diffusion channels 4a (the "distance between the centers of the light diffusion channels 4a which are adjacent to each other (which are adjacent to each other at least in the scanning direction of the laser light L1)" or the "distance between the vertexes of the light diffusion channels 4a which are adjacent to each other (which are adjacent to each other at least in the scanning direction of the laser light L1)" when viewed from a direction perpendicular to a plane where the plurality of light diffusion channels 4a are two-dimensionally arranged) is set so that the angle θ formed by the optical paths A and B becomes equal to or larger than the resolution angle of the eye E. The angle θ formed by the optical paths A and B is the angle θ formed by the optical paths A and B extending from the optical element (here, the front glass 100) at the last stage in the optical system 11 to the eye E of the observer through a pair of adjacent light diffusion channels 4a and 4a arbitrarily selected. As an example, since the resolution angle is 1 minute when the visual acuity of the assumed eye E is 1.0, the light diffusion unit 4 is configured so that the angle θ formed by the optical paths A and B becomes 1 minute or more. Further, since the resolution angle is 1.42 minute when the visual acuity of the assumed eye E is 0.7, the light diffusion unit 4 is configured so that the angle θ formed by the optical paths A and B becomes 1.42 minute or more. When the light diffusion unit 4 is the microlens array, the arrangement pitch of the plurality of light diffusion channels 4a is a "distance between the vertexes of the light diffusion channels 4a which are adjacent to each other (adjacent to each other at least in the scanning direction of the laser light L1)" and the vertex of the light diffusion channel 4a is a vertex of a microlens.

Figure 4:
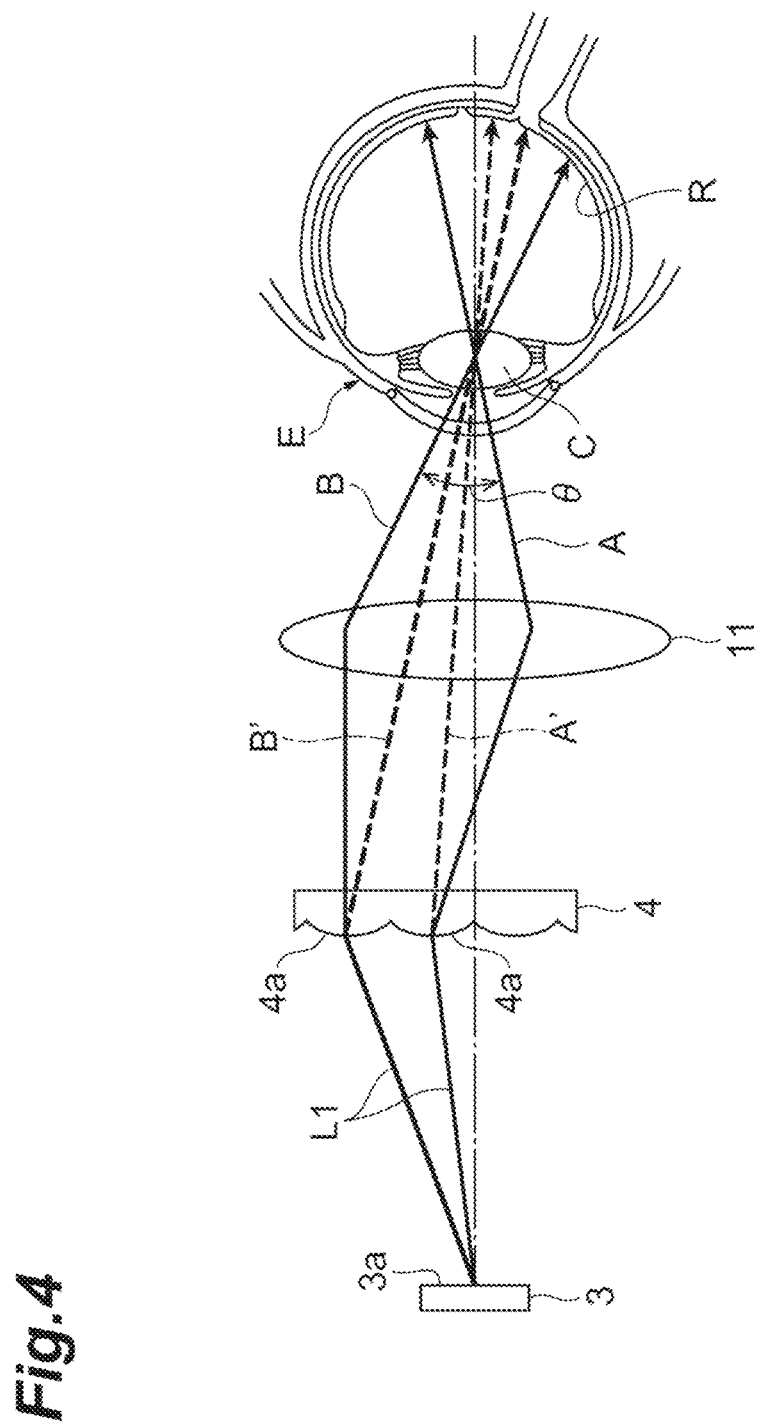
FIG. 4 is a diagram illustrating an optical path extending from an optical scanning unit to an eye through a light diffusion unit.

A relationship between the arrangement pitch of the plurality of light diffusion channels 4a and the resolution angle of the eye E will be described in more detail. FIG. 4 is a diagram illustrating the optical path extending from the optical scanning unit 3 to the eye E through the light diffusion unit 4. For convenience of description, in FIG. 4, the optical scanning unit 3, the light diffusion unit 4, the optical system 11, and the eye E are illustrated on one straight line and particularly the optical system 11 is simplified.

As illustrated in FIG. 4, the optical system 11 is an assembly of a plurality of optical elements (here, the flat mirror 11a, the flat mirror 11b, the concave mirror 11c, and the front glass 100) and has a function of magnifying an image in the light diffusion unit 4 which is a primary image surface. When the optical system 11 is disposed at the subsequent stage of the light diffusion unit 4, the light L2 is incident to the eye E through the optical paths A and B from a pair of adjacent light diffusion channels 4a and 4a arbitrarily selected. Here, the magnification of the optical system 11 is the "angle formed by the optical paths A and B"/the "angle formed by the optical paths A' and B' (the optical paths when there is no optical system 11)".

Thus, if the light diffusion unit 4 is configured so as to satisfy $\alpha \leq \tan^{-1}(P/L) \times M$ when the resolution angle of the assumed eye E is denoted by $\alpha$, the arrangement pitch of the plurality of light diffusion channels 4a is denoted by P, the magnification (the magnification of "Field Of View: FOV/viewing angle") of the optical system 11 disposed between the light diffusion unit 4 and the eye E is denoted by M, and the distance from the light diffusion unit 4 to the eye E (the length of the optical path extending from the light diffusion unit 4 to the eye E through the optical system 11) is denoted by L, luminance unevenness does not occur on the displayed image in the eye E having an assumed visual acuity at an assumed position. Thus, it is possible to manufacture the light diffusion unit 4 so that the angle θ formed by the optical paths A and B becomes equal to or larger than the resolution angle of the eye E (so as to satisfy $\alpha \leq \tan^{-1}(P/L) \times M$ when there is the optical system 11 or to satisfy $\alpha \leq \tan^{-1}(P/L)$ when there is not the optical system 11) by assuming the position and the visual acuity of the eye E of the observer and considering the existence of the optical system 11, the magnification M of the optical system 11, and the like.

As described above, according to the scanning-type display device 1 (and the scanning-type display system 10), the angle θ formed by the optical paths A and B extending to the eye E of the observer through a pair of light diffusion channels 4a and 4a arbitrarily selected can be set to be equal to or larger than, for example, the resolution angle of the eye E. Thus, according to the scanning-type display device 1, it is possible to suppress an occurrence of luminance unevenness on a displayed image in the eye E having an assumed visual acuity at an assumed position regardless of the size (the beam diameter) of the laser light L1 in the light diffusion unit 4.

In the scanning-type display device 1, the light diffusion unit 4 is configured so that the angle θ formed by the optical paths A and B becomes 1 minute or more. Accordingly, the angle θ formed by the optical paths A and B can be set to be equal to or larger than the resolution angle of the eye E having the visual acuity of 1.0. Thus, it is possible to suppress an occurrence of luminance unevenness on a displayed image in the eye E having the visual acuity of 1.0 or more. The light diffusion unit 4 may be configured so that the angle θ Ruined by the optical paths A and B becomes 1.42 minute or more. Accordingly, the angle θ formed by the optical paths A and B can be set to be equal to or larger than the resolution angle of the eye E having the visual acuity of 0.7. Thus, it is possible to suppress an occurrence of luminance unevenness on a displayed image in the eye E having the visual acuity of 0.7 or more.

In the scanning-type display device 1, when the resolution angle of the assumed eye E is denoted by α, the arrangement pitch of the plurality of light diffusion channels 4a is denoted by P, the magnification of the optical system 11 disposed between the light diffusion unit 4 and the eye E is denoted by M, and the distance from the light diffusion unit 4 to the eye E is denoted by L, the light diffusion unit 4 is configured so as to satisfy α≤tan$^{-1}$(P/L)×M. Accordingly, even when the optical system 11 is disposed between the light diffusion unit 4 and the eye E, in the eye E having an assumed visual acuity at an assumed position, it is possible to reliably suppress an occurrence of luminance unevenness on a displayed image.

In the scanning-type display device 1, the light diffusion unit 4 is a transmissive microlens array. Accordingly, it is possible to reliably and easily realize the diffusion of the laser light L1 by the plurality of light diffusion channels 4a arranged in two dimensions.

In the scanning-type display system 10, when the resolution angle of the assumed eye E is denoted by α, the arrangement pitch of the plurality of light diffusion channels 4a is denoted by P, the magnification of the optical system 11 disposed between the light diffusion unit 4 and the eye E is denoted by M, and the distance from the light diffusion unit 4 to the eye E is denoted by L, the light diffusion unit 4 is configured so as to satisfy α≤tan$^{-1}$(P/L)×M. Accordingly, even when the optical system 11 is disposed between the light diffusion unit 4 and the eye E, it is possible to reliably suppress an occurrence of luminance unevenness on a displayed image in the eye E having an assumed visual acuity at an assumed position.

In the method for manufacturing the light diffusion unit 4, the light diffusion unit 4 is manufactured so that the angle θ formed by the optical paths A and B becomes equal to or larger than the resolution angle of the eye E. Accordingly, it is possible to obtain the light diffusion unit 4 capable of suppressing an occurrence of luminance unevenness on a displayed image in the eye E having an assumed visual acuity at an assumed position regardless of the size of the laser light L1 in the light diffusion unit 4.

In the method for manufacturing the light diffusion unit 4, when the resolution angle of the assumed eye E is denoted by α, the arrangement pitch of the plurality of light diffusion channels 4a is denoted by P, the magnification of the optical system 11 disposed between the light diffusion unit 4 and the eye E is denoted by M, and the distance from the light diffusion unit 4 to the eye is denoted by L, the light diffusion unit 4 is manufactured so as to satisfy α≤tan$^{-1}$(P/L)×M. Accordingly, even when the optical system 11 is disposed between the light diffusion unit 4 and the eye E, it is possible to obtain the light diffusion unit 4 capable of reliably suppressing an occurrence of luminance unevenness on a displayed image in the eye E having an assumed visual acuity at an assumed position.

Although the embodiment of the present disclosure has been described above, the present disclosure is not limited to the above-described embodiment.

For example, the light source 2 is not limited to the laser diode (semiconductor laser) as long as coherent light (laser light) can be emitted therefrom and may be a surface emitting laser, a super luminescent diode (SLD), or the like. The optical scanning unit 3 is not limited to the MEMS mirror as long as the laser light can be used in scanning and may be a galvano mirror or the like. The light diffusion unit 4 is not limited to one which transmits and diffuses the laser light and may be one which reflects and diffuses the laser light. That is, the light diffusion unit 4 is not limited to the transmissive microlens array as long as the plurality of light diffusion channels 4a which are arranged in two dimensions are provided and may be a reflective microlens array, a micro mirror array, a diffraction grating, a fiber optic plate, or the like. When the light diffusion unit 4 is the transmissive microlens array, the light incident surface of the light diffusion unit 4 may be formed as a flat surface and the light emission surface of the light diffusion unit 4 may be formed as a plurality of convex surfaces corresponding to the plurality of microlenses. A plurality of concave surfaces may be formed instead of the plurality of convex surfaces so as to correspond to the plurality of microlenses.

The light diffusion unit 4 may be manufactured and configured so that the angle θ formed by the optical paths A and B becomes equal to or larger than the angle set on the basis of the resolution angle of the eye E. For example, the light diffusion unit 4 may be manufactured and configured so that the angle θ formed by the optical paths A and B becomes equal to or larger than the resolution angle of the eye E of α±0.1 minute. That is, there is no need to satisfy a condition that the angle θ formed by the optical paths A and B is equal to or larger than the resolution angle α of the eye E in all light diffusion channels 4a. The same applies to the above condition of a tan$^{-1}$(P/L)×M and the following condition of α≤tan$^{-1}$(M). The light diffusion unit 4 may be manufactured and configured so that the angle θ formed by the optical paths A and B becomes equal to or larger than the resolution angle α1 of the eye E (the resolution angle corresponding to the upper-limit value of the assumed visual acuity) and equal to or smaller than the resolution angle α2 of the eye E (the resolution angle corresponding to the lower-limit value of the assumed visual acuity). When the upper-limit value is set to the angle θ formed by the optical paths A and B, it is possible to suppress a decrease in resolution of the displayed image.

The arrangement pitch of the plurality of light diffusion channels 4a need not be constant and may be, for example, random. Accordingly, in the eye E having an assumed visual acuity at an assumed position, it is possible to more reliably suppress an occurrence of luminance unevenness on a displayed image.

For example, the optical system 11 may be provided with means for adjusting the angle θ formed by the optical paths A and B in order to suppress an occurrence of luminance unevenness on a displayed image in the changed eye E when at least one of the position and visual acuity of the assumed eye E is changed. In the optical system 11, for example, the magnification M of the optical system 11 and the distance L from the light diffusion unit 4 to the eye E can be adjusted.

In the scanning-type display device 1 (and the scanning-type display system 10), the optical system 11 may not be disposed at the subsequent stage of the light diffusion unit 4 (see FIG. 2). That is, the optical paths A and B may directly extend from the light diffusion unit 4 to the eye E. In that case, when the resolution angle of the assumed eye E is denoted by α, the arrangement pitch of the plurality of light diffusion channels 4a is denoted by P, and the distance from the light diffusion unit 4 to the eye E is denoted by L, the light diffusion unit 4 may be configured so as to satisfy $\alpha \le \tan^{-1}(P/L)$. Accordingly, when the optical system 11 is not disposed between the light diffusion unit 4 and the eye E, in the eye E having an assumed visual acuity at an assumed position, it is possible to reliably suppress an occurrence of luminance unevenness on a displayed image. In the method for manufacturing the light diffusion unit 4, when the resolution angle is denoted by $\alpha$, the arrangement pitch of the plurality of light diffusion channels 4a is denoted by P, and the distance from the light diffusion unit 4 to the eye E is denoted by L in a case in which the optical paths A and B directly extend from the light diffusion unit 4 to the eye E, the light diffusion unit 4 may be manufactured so as to satisfy $\alpha \le \tan^{-1}(P/L)$. Accordingly, when the optical system 11 is not disposed between the light diffusion unit 4 and the eye E, it is possible to obtain the light diffusion unit 4 capable of reliably suppressing an occurrence of luminance unevenness on a displayed image in the eye E having an assumed visual acuity at an assumed position.

The above-described scanning-type display device 1 is not limited to the in-vehicle type and can be used in various situations such as a helmet built-in type and glasses type.

REFERENCE SIGNS LIST

1 . . . scanning-type display device, 2 . . . light source, 3 . . . optical scanning unit, 4 . . . light diffusion unit, 4a . . . light diffusion channel, 10 . . . scanning-type display system, 11 . . . optical system, L1 . . . laser light

The invention claimed is:

1. A scanning-type display device comprising:
a light source which emits projection-display laser light;
an optical scanning unit which uses the laser light emitted from the light source in scanning; and
a light diffusion unit which includes a plurality of light diffusion channels arranged in two dimensions and diffuses the laser light used in scanning by the optical scanning unit,
wherein the light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye, and
wherein when the resolution angle is denoted by $\alpha$, an arrangement pitch of the plurality of light diffusion channels is denoted by P, a magnification of an optical system disposed between the light diffusion unit and the eye is denoted by M, and a distance from the light diffusion unit to the eye is denoted by L, the light diffusion unit is configured so as to satisfy $\alpha \le \tan^{-1}(P/L) \times M$.

2. The scanning-type display device according to claim 1, wherein the light diffusion unit is configured so that the angle formed by the optical paths becomes equal to or larger than 1 minute.

3. The scanning-type display device according to claim 2, wherein the light diffusion unit is configured so that the angle formed by the optical paths becomes equal to or larger than 1.42 minute.

4. The scanning-type display device according to claim 1, wherein the arrangement pitch of the plurality of light diffusion channels is random.

5. The scanning-type display device according to claim 1, wherein the light diffusion unit is a transmissive microlens array.

6. A scanning-type display system comprising:
a light source which emits projection-display laser light;
an optical scanning unit which uses the laser light emitted from the light source in scanning;
a light diffusion unit which includes a plurality of light diffusion channels arranged in two dimensions and diffuses the laser light used in scanning by the optical scanning unit; and
an optical system which is disposed at a subsequent stage of the light diffusion unit,
wherein the light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye, and
wherein when the resolution angle is denoted by $\alpha$, an arrangement pitch of the plurality of light diffusion channels is denoted by P, a magnification of the optical system is denoted by M, and a distance from the light diffusion unit to the eye is denoted by L, the light diffusion unit is configured so as to satisfy $\alpha \le \tan^{-1}(P/L) \times M$.

7. The scanning-type display system according to claim 6, wherein the light diffusion unit is configured so that the angle formed by the optical paths becomes equal to or larger than 1 minute.

8. The scanning-type display system according to claim 7, wherein the light diffusion unit is configured so that the angle formed by the optical paths becomes equal to or larger than 1.42 minute.

9. The scanning-type display system according to claim 6, wherein the arrangement pitch of the plurality of light diffusion channels is random.

10. A method for manufacturing a light diffusion unit used for a scanning-type display device including a light source which emits projection-display laser light, an optical scanning unit which uses the laser light emitted from the light source in scanning, and a light diffusion unit which includes a plurality of light diffusion channels arranged in two dimensions and diffuses the laser light used in scanning by the optical scanning unit,
wherein the light diffusion unit is manufactured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye, and
wherein when the resolution angle is denoted by $\alpha$, an arrangement pitch of the plurality of light diffusion channels is denoted by P, a magnification of an optical system disposed between the light diffusion unit and the eye is denoted by M, and a distance from the light diffusion unit to the eye is denoted by L, the light diffusion unit is manufactured so as to satisfy $\alpha \le \tan^{-1}(P/L) \times M$.

11. A method for manufacturing a light diffusion unit, used for a scanning-type display device including a light source which emits projection-display laser light, an optical scanning unit which uses the laser light emitted from the light source in scanning, and a light diffusion unit which includes a plurality of light diffusion channels arranged in two dimensions and diffuses the laser light used in scanning by the optical scanning unit, wherein the light diffusion unit is manufactured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye, and wherein when the resolution angle is denoted by $\alpha$, the arrangement pitch of the plurality of light diffusion channels is denoted by P, and the distance from the light diffusion unit to the eye is denoted by L in a case in which the optical path directly extends from the light diffusion unit to the eye, the light diffusion unit is manufactured so as to satisfy $\alpha \leq \tan^{-1}(P/L)$.

12. A scanning-type display device comprising:

a light source which emits projection-display laser light;

an optical scanning unit which uses the laser light emitted from the light source in scanning; and a light diffusion unit which includes a plurality of light diffusion channels arranged in two dimensions and diffuses the laser light used in scanning by the optical scanning unit, wherein the light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye, and wherein when the resolution angle is denoted by $\alpha$, the arrangement pitch of the plurality of light diffusion channels is denoted by P, and the distance from the light diffusion unit to the eye is denoted by L in a case in which the optical path directly extends from the light diffusion unit to the eye, the light diffusion unit is configured so as to satisfy $\alpha \leq \tan^{-1}(P/L)$.

13. The scanning-type display device according to claim 12, wherein the light diffusion unit is configured so that the angle formed by the optical paths becomes equal to or larger than 1 minute.

14. The scanning-type display device according to claim 13, wherein the light diffusion unit is configured so that the angle formed by the optical paths becomes equal to or larger than 1.42 minute.

15. The scanning-type display device according to claim 12, wherein the arrangement pitch of the plurality of light diffusion channels is random.

16. The scanning-type display device according to claim 12, wherein the light diffusion unit is a transmissive microlens array.

17. A scanning-type display system comprising:

a light source which emits projection-display laser light;

an optical scanning unit which uses the laser light emitted from the light source in scanning; and a light diffusion unit which includes a plurality of light diffusion channels arranged in two dimensions and diffuses the laser light used in scanning by the optical scanning unit, wherein the light diffusion unit is configured so that an angle formed by optical paths extending to an eye of an observer through a pair of adjacent light diffusion channels arbitrarily selected from among the plurality of light diffusion channels becomes equal to or larger than an angle set on the basis of a resolution angle of the eye, and wherein when the resolution angle is denoted by $\alpha$, the arrangement pitch of the plurality of light diffusion channels is denoted by P, and the distance from the light diffusion unit to the eye is denoted by L in a case in which the optical path directly extends from the light diffusion unit to the eye, the light diffusion unit is configured so as to satisfy $\alpha \leq \tan^{-1}(P/L)$.

18. The scanning-type display system according to claim 17, wherein the light diffusion unit is configured so that the angle formed by the optical paths becomes equal to or larger than 1 minute.

19. The scanning-type display system according to claim 18, wherein the light diffusion unit is configured so that the angle formed by the optical paths becomes equal to or larger than 1.42 minute.

20. The scanning-type display system according to claim 17, wherein the arrangement pitch of the plurality of light diffusion channels is random.

* * * * *